M. TIBBETTS.
ART OF MAKING GEARS.
APPLICATION FILED NOV. 22, 1915.

1,336,493.

Patented Apr. 13, 1920.
2 SHEETS—SHEET 1.

Witness:
Blair J. Cote.

Inventor:
Milton Tibbetts.

M. TIBBETTS.
ART OF MAKING GEARS.
APPLICATION FILED NOV. 22, 1915.

1,336,493.

Patented Apr. 13, 1920.
2 SHEETS—SHEET 2.

Witness: Clair J. Cote.

Inventor: Milton Tibbetts.

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

ART OF MAKING GEARS.

1,336,493.  Specification of Letters Patent.  Patented Apr. 13, 1920.

Application filed November 22, 1915. Serial No. 62,797.

*To all whom it may concern:*

Be it known that I, MILTON TIBBETTS, a citizen of the United States, and resident of Detroit, Wayne county, State of Michigan, have invented certain new and useful Improvements in the Art of Making Gears, of which the following is a specification.

This invention relates to gears and the method of making gears and particularly gears having rounded or chamfered tooth ends.

Spur gears as used in sliding gearing, in motor vehicle transmission boxes for instance, are usually chamfered at one or both ends of the teeth for the purpose of facilitating the sliding of the gears into mesh. Heretofore, this chamfering or rounding of the tooth ends has been done by a suitable cutting tool after the gear teeth have been cut. It is one of the salient objects of this invention to dispense with the necessity of this cutting operation to obtain the chamfered teeth, and in carrying out the invention the gear blank is subjected to a pressing or forging operation by a tool which serrates one or both of the peripheral edges of the blank and the tooth spaces are then cut in the blank to coincide with the serrations.

Other objects will appear from the following description, taken in connection with the drawings which form a part of the specification and in which.

Figure 1:
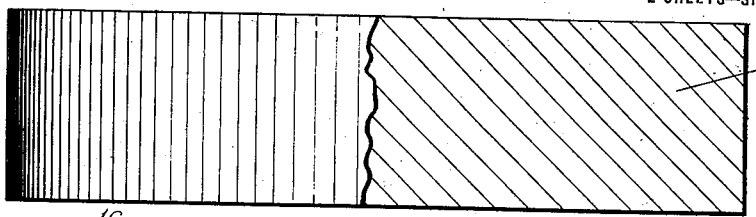
Figure 1 is an elevation and part sectional view of the blank of raw material out of which the gear is formed.
Figure 2:
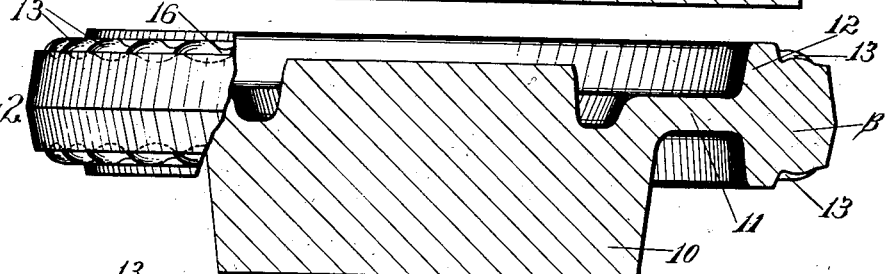
Fig. 2 is a similar view of the gear blank after the forging and serrating operation.

Referring to the drawings, B, throughout the figures, represents the gear or the blank from which it is made. In Fig. 1 it is simply a disk of iron or steel, or other metal, of the desired composition. In Fig. 2, the blank has been forged so that it comprises a central boss 10, a web portion 11, and a rim 12, upon which the teeth are to be formed. In this figure, also, as well as at the left in Fig. 5, the rim portion 12 of the blank has been serrated along its outer edges forming a series of rounded or chamfered projections 13 on both of the outer edges of the blank.

Figure 3:
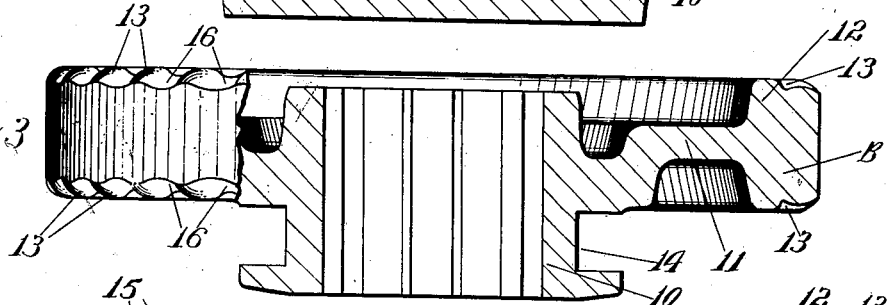
Fig. 3 is a similar view of the gear blank after being machined.

In Fig. 3 the surplus metal of the blank has been removed by machining, a groove 14 being formed in the boss 10 to receive the usual yoke for shifting the gear axially.

Figure 4:
Fig. 4 is a similar view of the finished gear.
Figure 5:
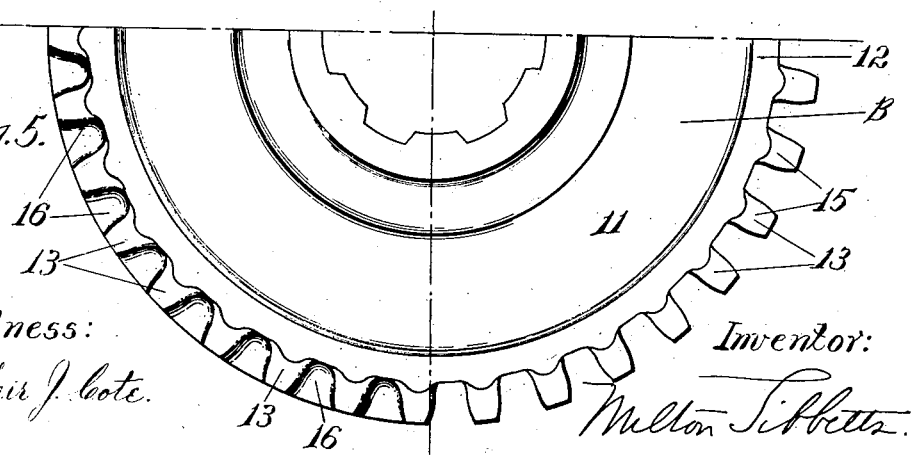
Fig. 5 is a plan view of a gear blank showing the serrations formed by stamping and also the completed teeth after the cutting operation.

In Fig. 4 the teeth 15 have been cut in the rim portion 12 of the gear blank, the spaces between the gear teeth corresponding to the depressions 16 shown in Figs. 2 and 5 between the projections 13. Thus the ends of each of the teeth 15 in the finished gear shown in Fig. 4 and at the right in Fig. 5, are rounded off or chamfered, for the purposes described above.

Figure 6:
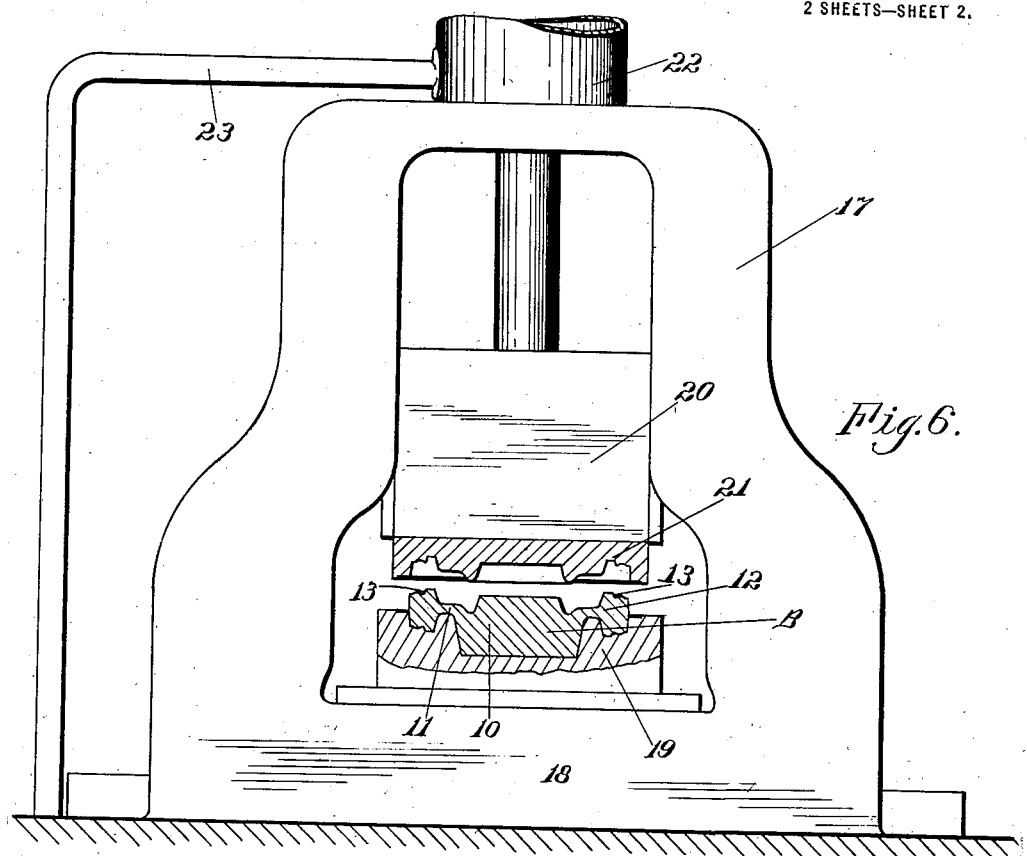
Fig. 6 shows a forging or stamping machine by which the raw material shown in Fig. 1 may be forged into the gear blank shown in Fig. 2.
Figure 7:
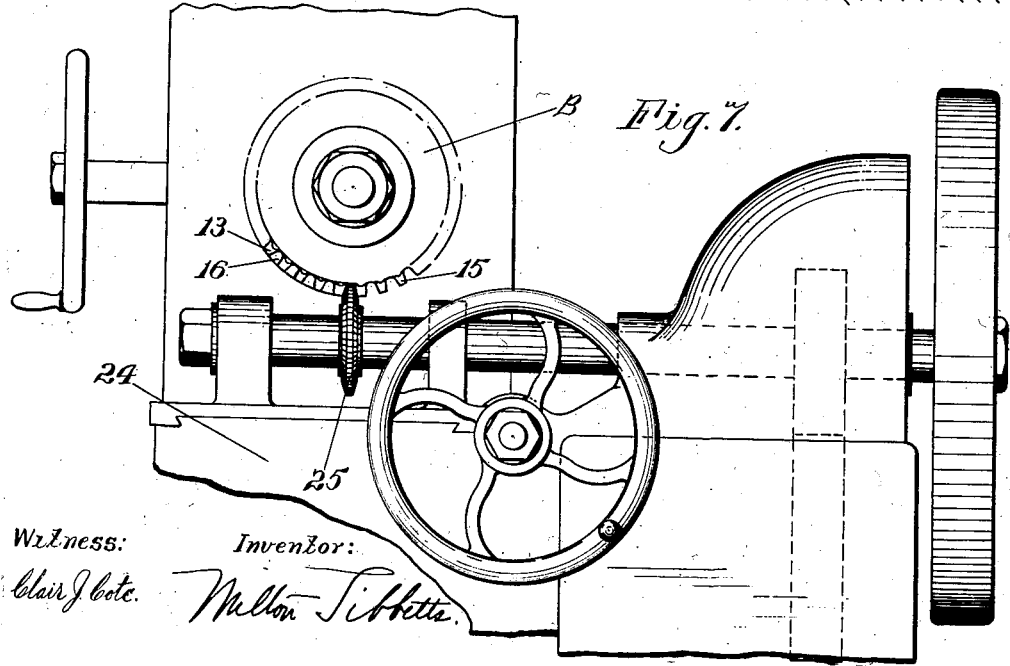
Fig. 7 shows a tooth cutting machine by which the gear may be completed.

For performing the various operations on the gear blanks, well known machines of the types illustrated in Figs. 6 and 7 may be used. In Fig. 6, a forging or stamping machine is shown at 17, and it comprises a stationary bed 18 upon which is mounted a die 19, and a movable bed 20 to which is secured a die 21. The movable bed or block 20 may be reciprocated toward the stationary bed 18 by a piston arranged in a suitable cylinder 22, to which steam or other pressure may be supplied as by a pipe 23.

The blank B, shown in Fig. 1 of the drawings may be forged or pressed into the shape in which it is shown in Fig. 2 and as resting in the die 19 in Fig. 6, by one or a series of forging or pressing operations. One or a series of roughing dies may first be used to approximate the shape shown in Fig. 2 and the final pressing or forging operation may use the finishing dies, such as shown in Fig. 6 at 19 and 21, so that the blank B is ready for machining, the projections 13 having been formed in the rim portion 12 of the blank.

For the purposes of this application, it hardly seems necessary to illustrate a machine for removing the surplus metal to bring the blank to the form shown in Fig. 3 as any well known lathe may be used.

In Fig. 7 is illustrated a machine for cutting the spaces between the teeth. This machine 24 comprises principally a rotating and reciprocating cutting tool 25, which cuts the tooth spaces in register with the depressions 16 above referred to, and thus leaves the finished gear shown in Fig. 4 and at the right in Fig. 5, with teeth 15 having machined side faces and pressed or forged chamfered ends.

One mode only of carrying out the steps of the method is shown but it is apparent that the invention is not limited thereby and that other modes could be used without departing from the spirit or scope of the invention as set forth in the claims.

Having thus described my invention, what I claim and desire to secure by Letters Patent is:—

1. A method of making toothed gears consisting in first forming rounded tooth ends on the blank by a pressing operation, and then forming the remainder of each tooth by a cutting operation.

2. A method of making toothed gears consisting in first forming all of the tooth ends on the blank and shaping said ends differently from the material of the blank between them and then forming the tooth spaces between said ends.

3. A method of making toothed gears consisting in first forming all of the tooth ends on the blank and shaping said ends differently from the material of the blank between them and then forming the tooth spaces between said ends by a cutting operation.

4. A method of making toothed gears consisting in first pressing the blank to form the tooth ends in one side of the blank and indicating the tooth positions thereon, and then cutting the tooth spaces to register between the tooth positions so indicated.

5. A method of making toothed gears consisting in first forming rounded tooth ends on the blank, and then forming the remainder of the teeth.

6. A method of making toothed gears consisting in first forming rounded tooth ends on the blank, and then cutting the remainder of the teeth.

7. A method of making gears consisting of forming a gear blank with serrations in one of its peripheral edges, and then cutting the tooth spaces to coincide with the serrations.

8. A method of making gears consisting of forming and indicating the tooth ends on the blank by pressing, and forming the remainder of each tooth by a cutting operation corresponding to the tooth end indications.

In testimony whereof I affix my signature.

MILTON TIBBETTS.